United States Patent
Naito et al.

(10) Patent No.: US 9,149,837 B2
(45) Date of Patent: Oct. 6, 2015

(54) SUBSTRATE HAVING ROD-LIKE MOLECULES ON SURFACE THEREOF AND METHOD FOR PRODUCING THE SAME

(71) Applicants: National University Corporation Nara Institute of Science and Technology, Ikoma-shi (JP); Tokyo Ohka Kogyo Co., Ltd., Kawasaki-shi (JP)

(72) Inventors: Masanobu Naito, Ikoma (JP); Yusuke Nakamura, Ikoma (JP); Toshiyuki Ogata, Kawasaki (JP); Toshikazu Takayama, Kawasaki (JP); Takayuki Hosono, Kawasaki (JP)

(73) Assignees: National University Corporation Nara Institute of Science and Technology, Ikoma-shi (JP); Tokyo Ohka Kogyo Co., Ltd., Kawasaki-shi (JP)

( * ) Notice: Subject to any disclaimer, the term of this patent is extended or adjusted under 35 U.S.C. 154(b) by 184 days.

(21) Appl. No.: 13/786,989

(22) Filed: Mar. 6, 2013

(65) Prior Publication Data
US 2013/0236947 A1 Sep. 12, 2013

(30) Foreign Application Priority Data
Mar. 8, 2012 (JP) ................................. 2012-052177

(51) Int. Cl.
C23C 16/52 (2006.01)
B05D 7/24 (2006.01)
C09D 7/12 (2006.01)
C09K 19/02 (2006.01)

(52) U.S. Cl.
CPC ................ *B05D 7/24* (2013.01); *C09D 7/1291* (2013.01); *C09K 19/02* (2013.01); *Y10T 428/24736* (2013.01)

(58) Field of Classification Search
None
See application file for complete search history.

(56) References Cited

U.S. PATENT DOCUMENTS

| 4,806,858 A * | 2/1989 | Elbicki ......................... 324/205 |
| 2004/0263735 A1* | 12/2004 | Kitson et al. .................. 349/123 |
| 2005/0079666 A1* | 4/2005 | French et al. ................. 438/200 |
| 2011/0027491 A1* | 2/2011 | Rueckes et al. ............... 427/458 |

OTHER PUBLICATIONS

Kim et al., "Blodgett Nanorod Assembly," J. Am. Chem. Soc., 2001, vol. 123, pp. 4360-4361.

(Continued)

*Primary Examiner* — Timothy Meeks
*Assistant Examiner* — Michael P Rodriguez
(74) *Attorney, Agent, or Firm* — Knobbe Martens Olson & Bear LLP

(57) ABSTRACT

A substrate having rod-like molecules on a surface thereof including: a substrate in which a pattern including a convex portion with a flat upper surface is formed on at least a portion thereof; and a plurality of rod-like molecules, which are formed into rod-like shape, are aligned in line in a direction crossing a molecular length direction of each of the rod-like molecules an the upper surface of the convex portion, and have liquid crystalline states, wherein the molecular length $L_R$ of the rod-like molecule is 2.0 or less times $L_N$, which is a length of the rod-like molecule in the molecular length direction within the convex portion; and a method for producing a substrate having rod-like molecules on a surface thereof.

6 Claims, 4 Drawing Sheets

(56) References Cited

OTHER PUBLICATIONS

Moulton et al., "Liquid Crystal Behavior of Single-Walled Carbon Nanotubes Dispersed in Biological Hyaluronic Acid Solutions," J. Am. Chem. Soc., 2007, vol. 129, pp. 9452-9457.

Rai et al., "Isotropic-Nematic Phase Transition of Single-Walled Carbon Nanotubes in Strong Acids," J. Am. Chem. Soc., 2006, vol. 128, pp. 591-595.

Lee et al., "Ordering of Quantum Dots Using Genetically Engineered Viruses," Science, 2002, vol. 296, pp. 892-895.

Atanasova et al., "Virus-Templated Synthesis of ZnO Nanostructures and Formation of Field-Effect Transistors," Adv. Mater, 2011, vol. 23, pp. 4918-4922.

Lin et al., "Self-Assembly of Virus Particles on Flat Surfaces via Controlled Evaporation," Langmuir, 2011, vol. 27(4), pp. 1398-1402.

Lin et al., "Self-Assembly of Rodlike Bio-Nanoparticles in Capillary Tubes," Angew Chem. Int. Ed., 2010, vol. 49, pp. 868-872.

\* cited by examiner

SUBSTRATE HAVING ROD-LIKE MOLECULES ON SURFACE THEREOF AND METHOD FOR PRODUCING THE SAME

TECHNICAL FIELD

The present invention relates to a method for producing a substrate in which rod-like molecules showing liquid crystalline states are adsorbed on an upper surface of a pattern that is formed on a surface of the substrate so that the rod-like molecules are directed to a certain direction, and relates to the substrate produced by the method.

This application claims priority to Japanese Patent Application No. 2012-052177 filed on Mar. 8, 2012, and the content of which is incorporated herein.

BACKGROUND ART

It is known that rod-like molecules having certain axial ratios (molecular length/diameter) show liquid crystalline states depending on densities. This phenomenon itself is a universal physical phenomenon controlled by thermodynamics, and it does not depend on materials and compositions of rod-like molecules. Generally, rod-like molecules self-assembled by a thermodynamic driving force have a domain structure. Examples of such rod-like molecules include inorganic semiconductor lots (see, for example, Non-Patent Document 1), carbon nanotubes (see, for example, Non-Patent Document 2 and 3), virus molecules such as bacteriophages (see, for example, Non-Patent Document 4), and the like.

In recent years, as large-scale integrated circuits (LSI) have become finer, a technique for processing of even finer structures has been required. To meet such a requirement, a domain structure formed by self-assembled rod-like molecules can be utilized to easily process fine structures in nano-sizes.

For example, zinc oxide is a useful semiconductor material for chemical sensors, solar cells, transistors, nanodevices such as carbon nanotube composite field emission devices and the like, and it is disclosed that a domain formation by self-assembled tobacco mosaic viruses (TMV), which are rod-like nanomolecules, can be used for forming a one-dimensional nanostracture, such as a nanowire of zinc oxide and the like (see, for example, Non-Patent Document 5).

When forming a domain structure by self-assembled rod-like molecules, it is difficult to control molecular directions between domains. To direct rod-like molecules to a certain direction, for example, a method for self-organizing TMV to a uniaxial direction by controlling an evaporation speed of a solvent of a TMV-dispersed solution (see, for example, Non-Patent Document 6), and a method for increasing a uniaxial orientation with a capillary force that is generated by drying a solvent of a TMV-dispersed solution in a capillary tube (see, for example, Non-Patent Document 7) have been disclosed.

DOCUMENTS OF RELATED ART

Non-Patent Documents

[Non-Patent Document 1] F. Kim, et al., J. Am. Chem. Soc., 2001, vol. 123: 4360-4361.
[Non-Patent Document 2] S. Moulton, et al., J. Am. Chem. Soc., 2007, vol. 129: 9452-9457.
[Non-Patent Document 3] P. Rai, et al., J. Am. Chem. Soc., 2006, vol. 128: 591-595.
[Non-Patent Document 4] S. Lee, et al., Science, 2002, vol. 296: 892-895.
[Non-Patent Document 5] P. Atanasova, et al., Adv. Mater. 2011, vol. 23: 4918-4922.
[Non-Patent Document 6] Y. Lin, et al., Langmuir, 2011, vol. 27 (4): 1398-1402.
[Non-Patent Document 7] Y. Lin, et al., Angew. Chem. Int. Ed., 2010, vol. 49: 868-872.

SUMMARY OF THE INVENTION

When controlling the orientation of rod-like molecules whose molecular lengths are widely distributed by self-organization in conventional methods such as the methods disclosed in Non-Patent Documents 6 and 7, the orientation does not depend on a density of the rod-like molecules, and will be random. That is, when controlling the orientation of rod-like molecules in conventional methods, it is important to use rod-like molecules whose molecular length distribution is narrower. However, the molecular length distributions of rod-like molecules such as a virus molecule, carbon nanotube and the like are generally wider. Therefore, in most cases, a pretreatment to collect fractions having narrower molecular length distributions (narrow dispersibility fractions) from rod-like molecules is necessary.

It is an object of the present invention to provide a method for directing and self-organizing rod-like molecules to a certain direction in a certain surface-area of a substrate, even when rod-like molecules whose molecular length distribution is wider are used and to provide a substrate having rod-like molecules obtained in the method on a surface of the substrate.

In the present invention, the following structures are employed to achieve the above objects.

The first aspect of the present invention is a substrate having rod-like molecules on a surface thereof including: a substrate in which a pattern including a convex portion with a flat upper surface is formed on at least a portion thereof, and a plurality of rod-like molecules, which are formed into rod-like shape, are aligned in line in a direction crossing a molecular length direction of each of the rod-like molecules on the upper surface of the convex portion, and have liquid crystalline states, wherein the molecular length $L_R$ of the rod-like molecule is 2.0 or less times $L_N$, which is a length of the rod-like molecule in the molecular length direction within the convex portion.

The second aspect of the present invention is a method for producing a substrate having rod-like molecules on a surface thereof including: allowing a solution or a dispersion liquid containing rod-like molecules that exhibit liquid crystalline states to flow on the surface of a substrate in which a pattern including a convex portion with a flat upper surface is formed on at least a portion of the surface thereof; and adsorbing the rod-like molecules on the upper surface of the convex portion such that the rod-like molecules are aligned in line in a direction crossing the molecular length direction of each of the rod-like molecules.

The third aspect of the present invention is a method for adsorbing rod-like molecules on the surface of a substrate, the method including: allowing a solution or a dispersion liquid containing rod-like molecules that exhibit liquid crystalline states to flow on the surface of the substrate in which a pattern including a convex portion with a flat upper surface is formed on at least a portion of the surface thereof; and adsorbing the rod-like molecules on the upper surface of the convex portion such that the rod-like molecules are aligned in line in a direction crossing the molecular length direction of each of the rod-like molecules.

The fourth aspect of the present invention is a method for narrowing a molecular length distribution of rod-like molecules, the method including: allowing a solution or a dispersion liquid containing rod-like molecules that exhibit liquid crystalline states to flow on the surface of the substrate in which a pattern including a line-shaped convex portion with a flat upper surface is formed on at least a portion of the surface thereof; selectively adsorbing rod-like molecules whose molecular lengths $L_R$ are 0.2 to 2.0 times the width dimension $L_W$ of the line-shaped convex portion among the rod-like molecules contained in the solution or the dispersion liquid on the upper surface of the convex portion such that the rod-like molecules are aligned in line in a direction crossing the molecular length direction of each of the rod-like molecules; and collecting the rod-like molecules adsorbed on the upper surface of the line-shaped convex portion by separating it from the substrate after adsorbing the rod-like molecules.

According to the present invention, rod-like molecules having certain molecular lengths can be selected depending on a width dimension of a convex portion of a pattern formed on a surface of a substrate, and the selected rod-like molecules can be adsorbed on an upper surface of the convex portion so that the rod-like molecules are directed to a certain direction.

DETAILED DESCRIPTION OF THE INVENTION

Figure 1:
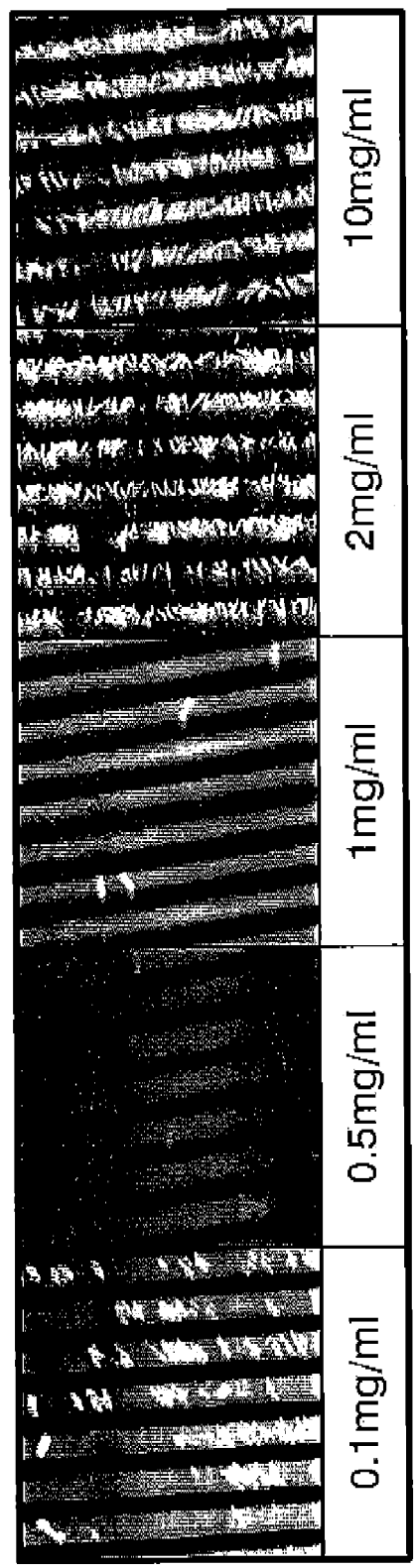
FIG. 1 shows each of atomic force microscopic images of surfaces of substrates having L/S patterns with pitches of 250 nm in Example 1.
Figure 2:
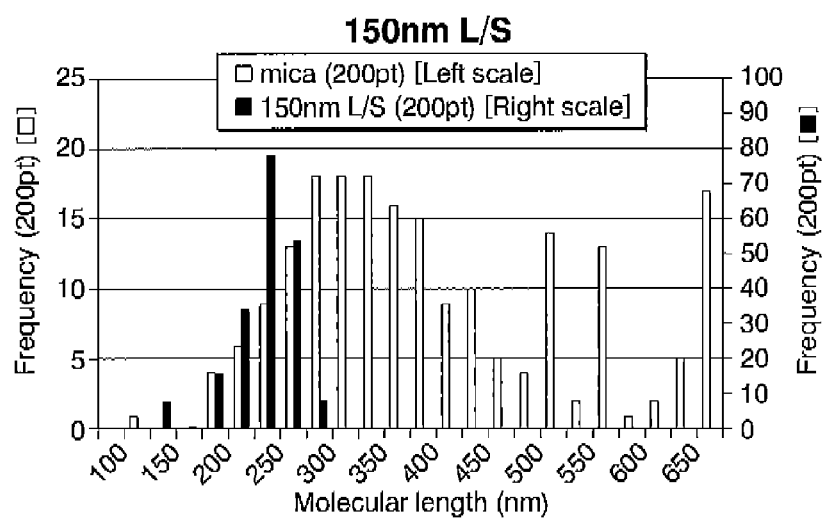
FIG. 2 is a histogram showing molecular lengths of TMV adhered on an upper surface of a line of a substrate having an L/S pattern with a pitch of 150 nm or on a surface of a mica substrate in Example 1.
Figure 3:
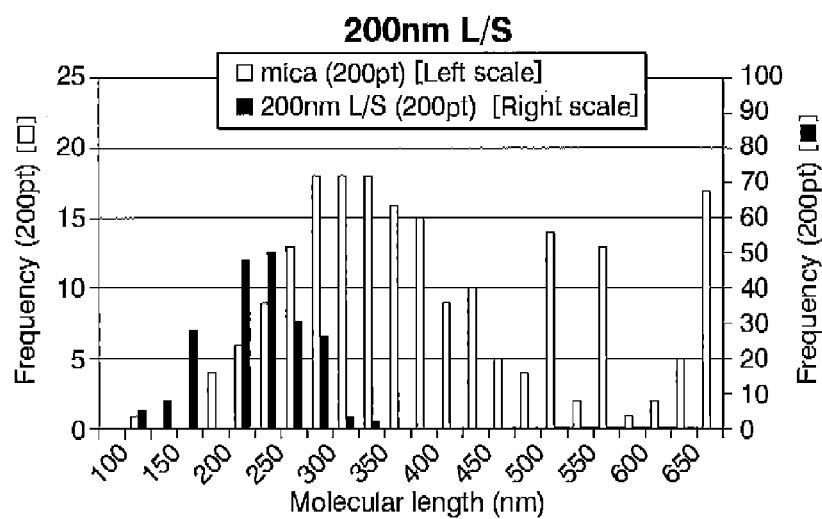
FIG. 3 is a histogram showing molecular lengths of TMV adhered on an upper surface of a line of a substrate having an L/8 pattern with a pitch of 200 nm or on a surface of a mica substrate in Example 1.
Figure 4:
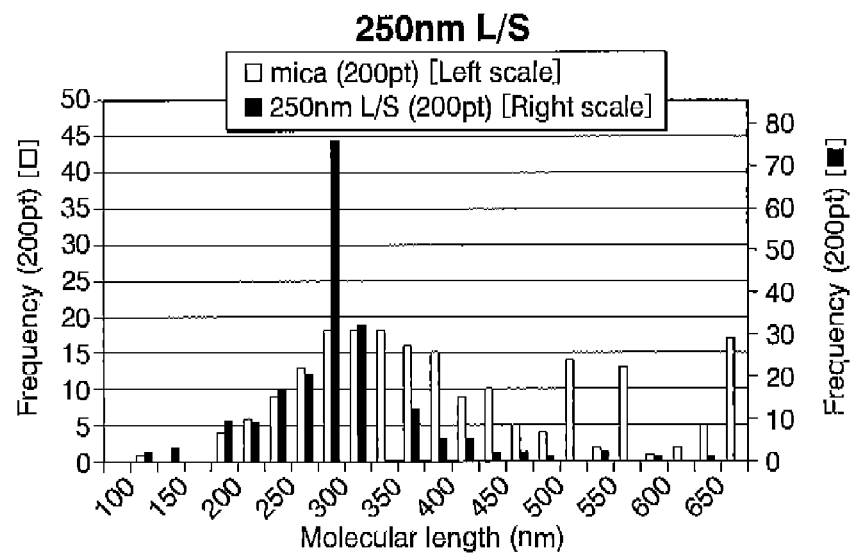
FIG. 4 is a histogram showing molecular lengths of TMV adhered on an upper surface of a line of a substrate having an L/S pattern with a pitch of 250 nm or on a surface of a mica substrate in Example 1.
Figure 5:
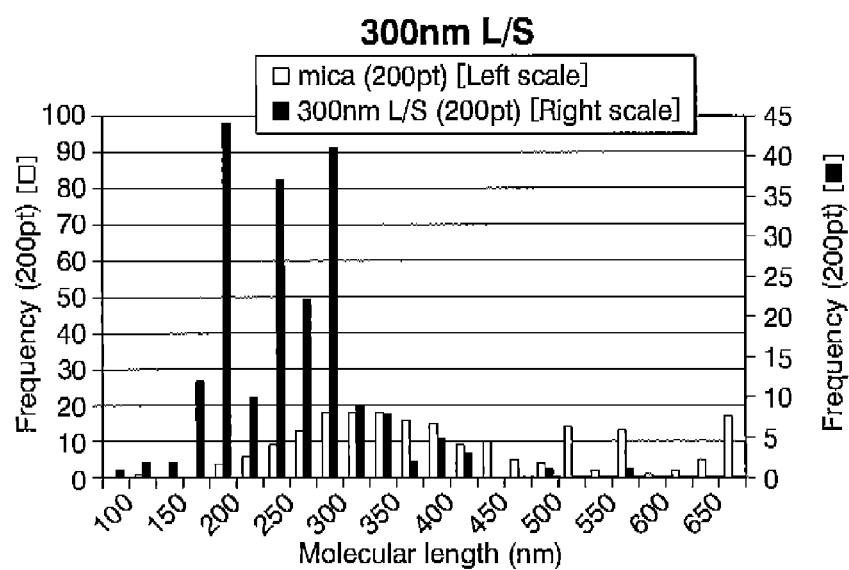
FIG. 5 is a histogram showing molecular lengths of TMV adhered on an upper surface of a line of a substrate having an L/S pattern with a pitch of 300 nm or on a surface of a mica substrate in Example 1.
Figure 6:
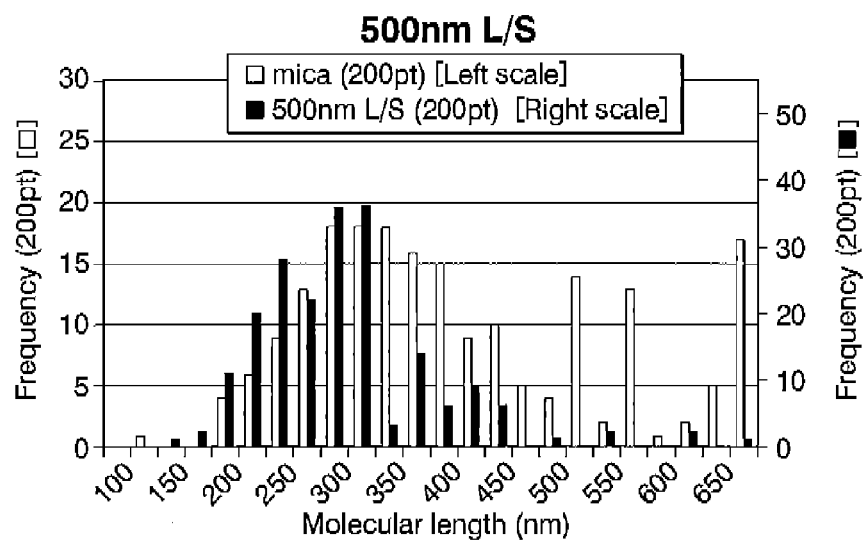
FIG. 6 is a histogram showing molecular lengths of TMV adhered on an upper surface of a line of a substrate having an L/S pattern with a pitch of 500 nm or on a surface of a mica substrate in Example 1.
Figure 7:
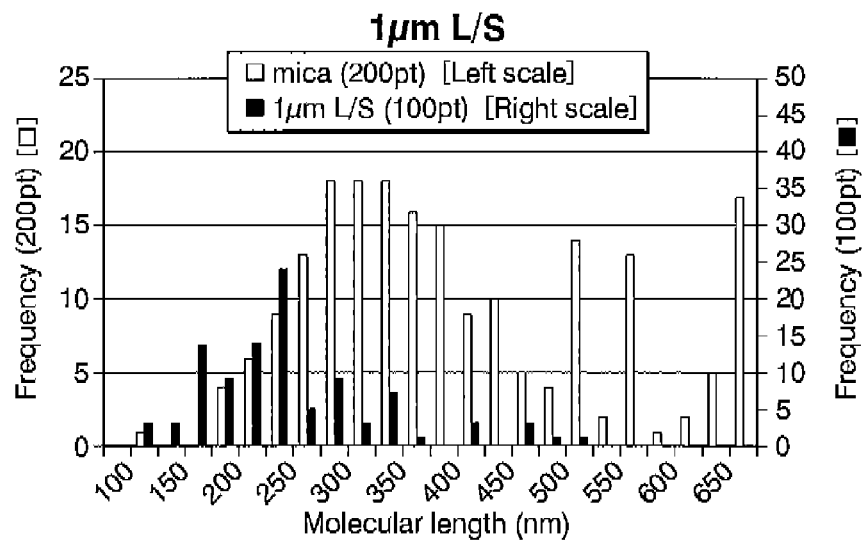
FIG. 7 is a histogram showing molecular lengths of TMV adhered on an upper surface of a line of a substrate having an US pattern with a pitch of 1 μm or on a surface of a mica substrate in Example 1.

<Method for Producing a Substrate Having Rod-Like Molecules on a Surface Thereof (Rod-Like Molecule-Adhered Substrate)>

A method for producing a substrate having rod-like molecules on a surface thereof according to the present invention (hereinafter, occasionally referred to simply as "method for producing a substrate of the present invention") includes an adsorbing step, in which a solution or a dispersion liquid containing rod-like molecules that show liquid crystalline states is run onto the surface of the substrate, in which a pattern having a convex portion with a flat upper surface is formed on at least a portion of the surface, and thereby the rod-like molecules are adsorbed on the upper surface of the convex portion such that the rod-like molecules are aligned in line in a direction crossing the molecular length direction of each of the rod-like molecules. By running a solution and the like containing rod-like molecules onto a surface of a substrate on which a pattern having a convex portion with a flat upper surface is formed, the rod-like molecules are adsorbed on the upper surface of the convex portion such that the rod-like molecules are directed to a certain direction. Also, among the rod-like molecules contained in the solution, rod-like molecules having molecular lengths within a certain range are selectively adsorbed on the upper surface of the convex portion. Accordingly, even when a molecular length distribution of rod-like molecules contained in a solution running onto a substrate surface is relatively wider, the molecular length distribution can be made narrower by collecting a narrow dispersibility fraction, and thus a purification of rod-like molecules with narrow dispersibility is not necessary.

[Rod-Like Molecule]

A rod-like molecule used in the present invention is not limited as long as it shows a liquid crystalline state. The liquid crystalline state means a property of self-organization (self-assembly) depending on a density. An aspect ratio (molecular length/diameter) determines whether rod-like molecules show a liquid crystalline state. An aspect ratio of a rod-like molecule used in the present invention is preferably 4 or greater, and more preferably 4 to 11.

A material and a composition of a rod-like molecule used in the present invention are not particularly limited. For example, inorganic molecules such as inorganic semiconductor lots and nanocarbon materials, or organic molecules such as macromolecule and protein can be used. Regarding organic molecules, not only naturally-occurring molecules including biomolecules such as viruses, but also artificially designed synthetic molecules can be used. A nanocarbon material is preferably a carbon nanotube. The number of layers and a structure of a carbon nanotube are not particularly limited, and single-wall carbon nanotubes and multi-wall carbon nanotubes can be used.

Regarding macromolecules, well-known liquid crystalline state macromolecules such as polyester, polysilane and the like can be used. Examples of a rod-like molecule composed of protein include virus molecules (in particular, virus capsid protein) such as M13 bacteriophages, pf1 bacteriophages, fd bacteriophages, TMV and the like; cellulose derivatives and the like. In consideration of handling, stability, variety of sizes, ease of chemical modification and the like, virus molecules and carbon nanotubes are preferably used in the present invention.

In consideration of a substrate used and a type of a pattern formed on a surface of the substrate, a material and a composition of a rod-like molecule used in the present invention are preferably determined. For example, when a pattern is formed on a resist film, a rod-like molecule that can be self-organized even in a relatively mild condition, such as a virus molecule is preferably used.

Although a size of a rod-like molecule used in the present invention is not particularly limited, the molecular length $L_R$ is preferably 1 μm or less, more preferably 800 nm or less, and still more preferably 750 nm or less. In a method for producing a substrate according to the present invention, a substrate on whose surface nano-sized fine structures are formed can be obtained by employing nano-sized rod-like molecules.

In a method for producing a substrate according to the present invention, a plurality of rod-like molecules are adsorbed on a flat upper surface of a convex portion on a surface of a substrate such that the rod-like molecules are aligned in line in a direction crossing the molecular length direction of each of the rod-like molecules. When rod-like molecules are self-organized in an upper surface of a convex portion with a molecular orientation that is not random, but one-direction, the molecular lengths $L_R$ of them are mostly suitable, that is, not too long or too short to the $L_N$, which is a dimension of a rod-like molecule in a molecular length direction at the convex portion. Accordingly, although whether a molecular length distribution is wider or narrower does not matter for rod-like molecules used in the present invention, rod-like molecules having molecular lengths that fit to a dimension of a convex portion on which rod-like molecules are adsorbed are preferably included. For example, when a dimension of a convex portion is 100 to 1000 nm, rod-like molecules having the molecular lengths $L_R$ of 100 to 2000 nm can be used.

[Substrate]

In a method for producing a substrate, on which rod-like molecules are adsorbed, according to the present invention, a convex portion with a flat upper surface can be directly formed on a surface of a substrate, or a thin film is firstly formed on a substrate surface, and then a pattern having a convex portion with a flat upper surface can be formed on the thin film. A pattern having a convex portion with a flat upper surface (hereinafter, occasionally referred to simply as "pattern") is not particularly limited, and the convex portion does not necessarily exist on the whole surface of a substrate as long as it exists on at least a portion of the surface.

Although a shape of a convex portion with a flat upper surface, which is on a substrate surface, is not particularly limited, a line-shape is preferable. A line-shaped convex portion is referred to as a convex portion in which a shape of an upper surface of the convex portion is slender, and a dimension in an extending direction is much shorter than a dimension in a width direction. In addition, the "line-shaped convex portion" that is physically distinguishable from other convex portions on a substrate is not limited to a convex portion that is entirely line-shaped, and a convex portion that is partially line-shaped is also included. That is, the "line-shaped convex portion" includes not only a linear convex portion such as a line portion of a line and space (L/S) pattern, but also line-shaped portions in a lattice-shaped convex portion, a curved convex portion, and a convex portion in which a line-shape and other shapes such as hole-shape, cylinder-shape and the like are combined.

An upper surface does not need to be strictly flat in a physical meaning, as long as it is flat so that rod-like molecules can be adsorbed on the upper surface as a molecular length direction is parallel to the upper surface. That is, a flatness of an upper surface is suitably determined also depending on a type of a rod-like molecule to be used. For example, a root-mean-square surface roughness (RMS) measured by an atomic force microscope (AFM) is preferably 5 nm or less, more preferably 3 min or less.

The type of a substrate is not particularly limited. For example, the substrate is composed of an inorganic material such as metal including silicon, copper, chromium, iron, aluminium and the like, glass, titanium oxide, silica, mica and the like; and the substrate is composed of an organic compound such as acrylic plate, polystyrene, cellulose, cellulose acetate, phenol resin and the like can be used.

The size and shape of a substrate used in the present invention are also not particularly limited. The surface of a substrate is not necessarily smooth, and a substrate with a variety of materials and shapes can be suitably selected. For example, a variety of shapes such as a substrate having a curved surface, a flat plate having a concave-convex surface, a slice-shape and the like can be used.

An inorganic and/or organic film may be provided on a substrate surface. An example of an inorganic film is an inorganic antireflection film (inorganic BARC). An example of an organic film is organic antireflection film (organic BARC).

When a substrate, which has a pattern-formed thin film on a surface thereof, is used, the substrate surface may be washed prior to forming the thin film on the substrate. By washing a substrate surface, a following thin film-forming step may be successfully performed.

Conventional well-known methods, such as oxygen plasma treatment, hydrogen plasma treatment, ozone oxidation treatment, acid-alkali treatment, chemical modification treatment and the like can be used as a washing treatment. For example, a substrate is immersed in an acid solution such as a sulfuric acid/hydrogen peroxide aqueous solution, and then washed and dried. After that, a thin film can be formed on a surface of the substrate.

The thin film can be a photosensitive film or a non-photosensitive film. Also, it can be an organic film or an inorganic film. For example, a certain pattern can be formed on an organic film or an inorganic film by an imprint method. A thin film used in the present invention is preferably a photosensitive or non-photosensitive organic film, more preferably a photosensitive or non-photosensitive resist film.

A method for forming a pattern-formed resist film is not particularly limited, and can be selected from well-known methods used for forming a pattern on a resist film. When using a photolithography method, for example, a pattern-formed resist film can be formed by forming a film constituted of a resist composition on a substrate surface that is subjected to a washing treatment or a neutralizing treatment as required; selectively exposing the film to radiation such as light, electron beam and the like through a mask on which a particular pattern is formed; and developing the film.

A resist composition used for forming a pattern can be suitably selected from resist compositions and modifications thereof which are generally used for forming resist patterns. The resist composition can be a positive resist composition or a negative resist composition.

Also, a developing solution used for development can be an alkali developing solution or an organic developing solution containing an organic solvent.

For example, a pattern can be formed by using a positive resist composition containing a base component that exhibits increased solubility in an alkali developing solution by action of acid and an acid-generator component that generates acid upon exposure. When such a positive resist composition is irradiated (exposed) with radiation, acid is generated from an acid-generator component, and action of the acid increases polarity, and thus solubility in an alkali developing solution is increased. Accordingly, in pattern formation, when a resist film obtained with the resist composition is selectively exposed, solubility of an exposed portion of the resist film in the alkali developing solution is increased while an unexposed portion remains insoluble, and thus an exposed portion is removed by alkaline development and a pattern is formed. A composition containing a base component that not only exhibits increased solubility in an alkali developing solution by action of acid, but also generates an acid when exposed, can also be used as the positive resist composition.

That is, for example, the positive resist composition is applied onto a substrate surface by a spinner and the like, and prebake (post applied bake (PAB)) is performed at 80 to 150°

C. for 40 to 120 sec, preferably for 60 to 90 sec. Then, the substrate surface is selectively exposed to an ArF excimer laser beam by, for example an ArF exposure apparatus through a mask of a pattern, and PEB (post exposure bake) is performed at 80 to 150° C. for 40 to 120 sec, preferably for 60 to 90 sec. Then, the substrate surface is developed with an alkali developing solution, such as 0.1 to 10 wt % tetramethyl ammonium hydroxide (TMAH) aqueous solution, and is water-rinsed preferably with pure water and then dried. A baking treatment (post bake) may occasionally be performed after the development. According to the above, a pattern identical to a mask pattern can be formed.

A pattern can be formed also by using a negative resist composition containing a base component whose polarity is increased by action of acid, and thus solubility in a developing solution containing an organic solvent is decreased, and an acid-generator component that generates acid upon exposure. When such a negative resist composition is irradiated (exposed) with radiation, acid is generated from the acid-generator component, and solubility of the base component to an organic solvent is decreased by action of the acid. Accordingly, in pattern formation, when a resist film obtained with the resist composition is selectively exposed, solubility of an exposed portion of the resist film in the organic developing solution containing the organic solvent is decreased while solubility of an unexposed portion in the organic developing solution is not changed, and thus an unexposed portion is removed by negative development using the organic developing solution, and them a pattern is formed.

In addition, a pattern can be formed also by using a negative resist composition containing a base component soluble in an alkali developing solution, an acid-generator component that generates acid upon exposure, and a cross-linker. In such a negative resist composition, when acid is generated from an acid-generator component, a base component and a cross-linker component are cross-linked by action of the acid, and then the negative resist composition becomes insoluble in an alkali developing solution. Accordingly, in pattern formation, when a resist film obtained with the resist composition is selectively exposed, an exposed portion of the resist film becomes insoluble in an alkali developing solution while an unexposed portion remains soluble in an alkali developing solution, and thus an unexposed portion is removed by alkaline development and a pattern is formed.

In addition, a pattern can be formed also by using an etching treatment. For example, after a resist film is formed by applying a resist composition onto a substrate surface that is subjected to a washing treatment or a neutralizing treatment as required, a pattern-formed mask that is resistant to dry etching is placed on the resist film, and then dry etching treatment is performed to form a pattern-formed resist film. Examples of dry etching treatment include oxygen plasma treatment, hydrogen plasma treatment, ozone treatment, UV irradiation treatment and the like.

A pattern can be formed also by wet etching treatment. That is, a non-photosensitive resist film is formed on a substrate surface, and then a photosensitive resist film is formed on the photosensitive resist film, and finally a pattern is formed on the photosensitive resist film. After that, an organic solvent to which the non-photosensitive resist film is more soluble than the photosensitive resist film is used to dissolve and remove an area in the non-photosensitive resist film, which is unmasked by the pattern, and thereby the pattern is formed on the non-photosensitive resist film. Silica films such as a film containing $SiO_2$ as a main component can preferably be used as the non-photosensitive resist film. A film containing $SiO_2$ as a main component can be formed by, for example, the SOG (spin-on-glass) method, in which a solution of silicon compound dissolved in an organic solvent is applied and treated with heat; chemical vapor deposition; and the like. In addition, a photosensitive resist composition can be suitably selected from resist compositions and modifications thereof which are generally used for forming resist patterns.

A resist composition used for forming a pattern can be suitably selected from resist compositions and modifications thereof which are generally used for forming resist patterns.

[Adsorbing Step]

By running a solution or a dispersion liquid containing rod-like molecules onto a surface of a substrate on which a pattern is formed, the rod-like molecules are adsorbed on an upper surface of a convex portion in the pattern, such that the rod-like molecules are aligned in line in a direction crossing the molecular length direction of each of the rod-like molecules.

A liquid running onto a substrate surface can be a solution in which rod-like molecules are dissolved, or can be a liquid in which rod-like molecules are dispersed, as long as the liquid contains rod-like molecules. A solvent of a solution or a dispersion liquid containing rod-like molecules (hereinafter, occasionally referred to as "rod-like molecule solution") is not particularly limited, as long as it does not inhibit structures and self-organization of rod-like molecules and also does not impair a pattern of a substrate and a surface thereof, and it can be suitably selected from well-known solvents by considering a type of a rod-like molecule, a type of a substrate, and composition of a thin film when a pattern is formed on the thin film of a substrate surface. When a substrate in which a pattern is formed on a thin film is used, water is preferable as a solvent for a rod-like molecule solution.

In addition to a rod-like molecule and a solvent, other components can be added to a rod-like molecule solution as long as the component does not impair effects of the present invention. Other components will be added, for example, to increase solubility and dispersibility of rod-like molecules in a solvent, and to facilitate self-organization of rod-like molecules.

Examples include a surfactant such as SOBS (sodium dodecylbenzenesulfonate), pH adjuster, inorganic salt, organic salt, pH buffer and the like.

Rod-like molecules are self-organized depending on a density. Therefore, a density of rod-like molecules in a rod-like molecule solution is preferably a density by which the rod-like molecules can be self-organized. However, when a density is too high, rod-like molecules tend to be self-organized as a plurality of layers on an upper surface of a convex portion. A preferable density for directing and self-organizing rod-like molecules to a certain direction on an upper surface of a convex portion as one layer can be suitably determined with experiments, depending on a type of a rod-like molecule. When rod-like molecules are virus molecules or carbon nanotubes, for example, density of rod-like molecules in a rod-like molecule solution is preferably 1 to 10 mg/mL, more preferably 1.5 to 5 mg/mL, and still more preferably 2 to 5 mg/mL.

By running a rod-like molecule solution on a surface of a pattern, rod-like molecules are self-organized on an upper surface of a convex portion with a flat upper surface in the pattern, and adsorbed on the upper surface, such that a molecular length direction is parallel to the upper surface, and the rod-like molecules are aligned in line in a direction crossing the molecular length direction of each of the rod-like molecules. Accordingly, a layer of rod-like molecules with a uniaxial orientation is formed on the upper surface. Thus, an orientation and a sequence of self-organized rod-like molecules can be easily controlled by using a method for producing a substrate of the present invention.

When a convex portion with a flat upper surface on a substrate surface has a line-shape, rod-like molecules are adsorbed on the upper surface of the convex portion as they are parallel to each other in a direction, in which molecular length directions of the rod-like molecules are parallel to the width direction of the convex portion (in addition to a completely parallel direction, a direction crossing with an angle of 10° or less is also included), to form a layer with a uniaxial orientation. That is, rod-like molecules adhered to a convex portion upper surface are self-organized as directed to a direction substantially orthogonal to an extending direction of the convex portion (a direction crossing with an angle of)80°-100°.

When the line-shaped convex portion is substantially a straight line, all rod-like molecules adsorbed on an upper surface of the line-shaped convex portion can be directed to a certain direction that is substantially perpendicular to an extending direction of the convex portion. Examples of a convex portion that is substantially a straight line include, for example, a straight line-shaped convex portion; a line portion of an L/S pattern; a portion of a lattice-shaped convex portion other than a crossing portion, which is substantially a straight line; a portion of a curved convex portion, which has a very small curvature, and can be partially approximated to a straight line.

The molecular length $L_R$ of a rod-like molecule composing a layer with a uniaxial orientation on an upper surface of a convex portion depends on a dimension of the convex portion. That is, on an upper surface of a convex portion, rod-like molecules having sizes corresponding to a dimension of the convex portion selectively form a layer with a uniaxial orientation. The molecular length $L_R$ of a rod-like molecule composing a layer with a uniaxial orientation is 2.0 or less times $L_N$, preferably 0.2 to 2.0 times $L_N$, which is a dimension of the rod-like molecule in the molecular length direction at the convex portion.

When a convex portion with a flat upper surface on a substrate surface has a line-shape, the molecular length $L_R$ of a rod-like molecule composing a layer with a uniaxial orientation on an upper surface of a convex portion is 2.0 times or less, preferably 1.7 times or less, and more preferably 1.5 times or less of the dimension $L_W$ of the convex portion in the width direction. Also, the molecular length $L_R$ is preferably 0.2 times or more, more preferably 0.4 times or more, still more preferably 0.6 times or more, and still more preferably 0.9 times or more of the dimension $L_W$ of the convex portion in the width direction.

A method for running a rod-like molecule solution on a surface of a pattern is not particularly limited, and for example, a rod-like molecule solution can be run onto a substrate surface, or a rod-like molecule solution can be dropped onto a substrate surface, and the substrate is left at rest. Since a pattern formed on a substrate surface serves as a flow pass, a rod-like molecule solution dropped onto the substrate surface flows without any particular handling.

A drying step for drying the substrate can be provided after a rod-like molecule solution is run onto a surface of a pattern. By drying the substrate, a solvent in the rod-like molecule solution is removed. A method for drying is not particularly limited, and is determined by considering a type of a solvent, a property of a rod-like molecule and the like. For example, it can be air-drying, drying by heating, heated-air drying, or vacuum drying.

In addition, after a rod-like molecule solution is dropped onto a substrate surface, or after the substrate is dried, a washing step for washing the substrate can be provided. A rod-like molecule having the molecular length $L_R$, which is much longer or much shorter than a dimension of an upper surface of a convex portion, may be adsorbed on areas other than an upper surface of a convex portion, such as a wall of a convex portion, or a concave portion of a pattern. By washing a substrate after drying, rod-like molecules adsorbed on areas other than an upper surface of a convex portion can be removed. A washing liquid used for washing is not particularly limited as long as it does not impair a layer with a uniaxial orientation of rod-like molecules formed on an upper surface, a pattern and the like. For example, a type of washing liquid is preferably the same as that of a solvent of a rod-like molecule solution. In particular, when a substrate in which a pattern is formed on a thin film is used, water is preferable as a washing liquid.

An adsorbing step of rod-like molecules, a drying step of a substrate, and a washing step of a substrate can also be performed in one process. For example, after a rod-like molecule solution is dropped onto a substrate surface, a process for running a rod-like molecule solution onto a surface of a pattern and a process for drying a substrate can be rapidly performed by employing a spin coat method, in which the substrate is rotated to spin off a rod-like molecule solution.

In a method for producing a substrate of the present invention, rod-like molecules can be selectively adsorbed on an upper surface of the convex portion depending on molecular lengths by a very simple method, in which a rod-like molecule solution is dropped onto a substrate on which a pattern having a convex portion is formed, and the substrate is dried as required. Therefore, for example, by using a substrate on whose surface an L/S pattern having a suitable pitch is formed, a layer with a uniaxial orientation of rod-like molecules whose molecular lengths are within a certain range can be easily formed on an upper surface of a line portion. Also, by adjusting a line width of an L/S pattern, rod-like molecules having desired sizes can be adsorbed on an upper surface of the line. That is, by using a method for producing a substrate of the present invention, a large area ultrathin film of rod-like molecules with a uniaxial orientation can be easily produced only with a simple method such as a drop-casting method, even if precise film-forming techniques such as rubbing and Langmuir-Blodgett film formation are not employed.

<Substrate Having Rod-Like Molecules on a Surface Thereof (Rod-Like Molecule-Adhered Substrate)>

A rod-like molecule-adhered substrate of the present invention has a substrate, in which a pattern having a convex portion with a flat upper surface is formed on at least a portion of a surface thereof, and a plurality of rod-like molecules, which are aligned in line in a direction crossing a molecular length direction of each of the rod-like molecules and show liquid crystalline states, on the upper surface of the convex portion, and in which the molecular length $L_R$ of the rod-like molecule is 2.0 or less times $L_N$, which is a dimension of the rod-like molecule in the molecular length direction at the convex portion. In a rod-like molecule-adhered substrate of the present invention, rod-like molecules having molecular lengths within a certain range are adsorbed on an upper surface of a convex portion of a pattern that is formed on a substrate surface so that the rod-like molecules are directed to a certain direction, and the substrate can be produced by, for example, a method for producing a substrate of the present invention.

Since a rod-like molecule-adhered substrate of the present invention has a fine line structure that is formed by self-organized rod-like molecules directed to a certain direction, it is useful in functional materials having ultra micro structures, such as an ultra micro electronic circuit and a photoelectric conversion material. Also, a layer with a uniaxial orientation of rod-like molecules can be used as a mask. Accordingly, a finer pattern than conventional patterns can be formed by utilizing a lithography method. In addition, the rod-like molecule-adhered substrate of the present invention is useful in a material of a solar cell, photocatalyst, inorganic luminescent material, carbon nanotube composite field emission device, chemical sensor, biochip and the like.

<Method for Narrowing a Molecular Length Distribution of Rod-Like Molecules>

A method for narrowing a molecular length distribution of rod-like molecules of the present invention (hereafter, occasionally referred to as "narrowing method of the present invention") includes an adsorbing step in which the rod-like molecule solution is run onto the surface of the substrate, in which a pattern having a line-shaped convex portion with a flat upper surface is formed on at least a portion of the surface, and thereby, among rod-like molecules contained in the rod-like molecule solution, rod-like molecules whose molecular lengths $L_R$ are 0.2 to 2.0 times the width dimension $L_W$ of the line-shaped convex portion are selectively adsorbed on the upper surface of the line-shaped convex portion such that the rod-like molecules are aligned in line in a direction crossing the molecular length direction of each of the rod-like molecules; and a collecting step following the adsorbing step, in which the rod-like molecules adsorbed on the upper surface of the convex portion are separated from the substrate and collected.

In the adsorbing step, a rod-like molecule solution is run onto a substrate surface, and then the substrate is dried and washed. The adsorbing step can be performed in a similar manner to the method for producing a substrate of the present invention. According to the adsorbing step, among rod-like molecules contained in the rod-like molecule solution, molecules whose molecular lengths $L_R$ are within a certain range to the dimension $L_W$ of a convex portion in a width direction are selectively adsorbed on an upper surface of a line-shaped convex portion. In addition, rod-like molecules whose molecular lengths $L_R$ are out of the certain range are not adsorbed on the upper surface, and are removed from a substrate surface by washing.

In the narrowing method of the present invention, a convex portion with a flat upper surface formed on a substrate surface is a line-shaped convex portion, and is preferably a line portion of an L/S pattern. A dimension of a convex portion, particularly the dimension $L_W$ of a convex portion in a width direction is suitably adjusted corresponding to a desired molecular length $L_R$ obtained by the narrowing method of the present invention. Thus, the desired molecular length $L_R$ of a rod-like molecule determines an L/S pattern, and adjusts the dimension $L_W$ of a convex portion. That is, an adjustment is performed so that the desired molecular length $L_R$ is 0.2 to 2.0 times the dimension $L_W$ of a line-shaped convex portion in a width direction, in other words, so that the dimension $L_W$ is 0.5 to 5 times the molecular length $L_R$. In the narrowing method of the present invention, the width dimension $L_W$ is preferably 0.6 to 2.5 times, and more preferably 0.6 to 1.7 times the desired molecular length $L_R$.

After the adsorbing step, rod-like molecules adsorbed on a substrate surface are collected. According to that, rod-like molecules whose molecular lengths $L_R$ are within a certain range that depends on the width dimension $L_W$ of a convex portion are selectively collected from rod-like molecules originally contained in a rod-like molecule solution, and therefore a molecular length distribution of the collected rod-like molecules can be made narrower than that of the rod-like molecules originally contained in a rod-like molecule solution. That is, rod-like molecules with narrow dispersibility whose molecular lengths $L_R$ are within a desired range can be easily obtained by the narrowing method of the present invention. For example, when a pattern is formed on a resist film, rod-like molecules can be collected by dissolving a resist film on a substrate surface. In addition, rod-like molecules on a substrate surface can be collected also by transcribing onto a silicon substrate surface such as PDMS (polydimethylsiloxane).

EXAMPLES

The present invention will be explained more particularly by the following examples; however, the present invention is not limited thereto.

Example 1

(1) Purification of TMV (Tobacco Mosaic Virus)

In a mixer, 100 g of frozen TMV-infected leaves, 125 mL of 0.1 M phosphate buffer, and 125 µL of mercaptoacetic acid were placed, and an obtained suspension of a ground mixture was left on ice for 10 min. After the given time, the suspension was centrifuged at 4° C., 9000 rpm for 10 min, and an obtained supernatant was filtrated. To 100 mL of the filtrate, 6 mL of 2M sodium chloride aqueous solution, and 20 mL of polyethylene glycol (molecular weight: 6000) were added and stirred manually, and then left on ice for 30 min for salting-out. After the given time, the salting-out solution was centrifuged at 4° C., 12000 rpm for 10 min. After the centrifugation, 8 mL of 10 mM ethylenediaminetetraacetic acid solution was added only to a residue, and the residue was completely dissolved by using a vortex mixer, and then centrifuged at 4° C., 9000 rpm for 5 min, followed by ultra centrifugation at 4° C., 50000 rpm for 1 hr. To a white precipitation in an ultra centrifugation tube, 100 µL of distilled water was added, and left overnight. The solution which had been left was transferred into a 1.5 mL volume tube, and centrifuged at 4° C., 15000 rpm for 1 min, and only a supernatant was collected as a purified TMV solution. According to a UV measurement, a virus concentration of the purified TMV solution was determined as 10 mg/mL from an absorbance at 260 nm. Also, molecular weight of a virus molecule contained in the purified TMV solution was confirmed as 18 kDa by electrophoresis.

(2) L/S Pattern Formation

Firstly, the ArF positive resist composition solution TArF-8a-84 (manufactured by Tokyo Ohka Kogyo Co., Ltd.) was applied onto an HMDS-treated 12-inch silicon wafer with a spinner, and subjected to prebake (PAB) treatment on a hot plate at 140° C. for 60 sec, and then dried to form a resist film having a film thickness of 333 nm for pattern formation.

Next, the resist film was selectively irradiated with ArF excimer laser (193 nm) through mask patterns (6% halftone) to form L/S patterns having pitches of 150, 200, 250, 300, 500 nm, or 1 µm by the ArF exposure apparatus NSR-S308F (manufactured by Nikon Corporation; NA (numerical aperture)=0.92). The resist film was then subjected to a post exposure bake (PEB) treatment at 115° C. for 60 sec, and developed with the 2.38 wt % TMAH aqueous solution (NMD-3, manufactured by Tokyo Ohka Kogyo Co., Ltd.) at 23° C. for 30 sec, and dried by spinning off. The resist film was then subjected to a post bake treatment at 100° C. for 45 sec. As a result, L/S patterns each of which had a pitch of 150, 200, 250, 300, 500 nm, or 1 μm were formed. Ten substrates on which L/S patterns having one of the pitches were formed were prepared respectively.

(3) Adsorption of TMV

Distilled water was added to a 10 mg/mL purified TMV solution obtained in (1) to prepare 0.1, 0.5, 1, 2, and 10 mg/mL TMV solutions. To the US pattern formed in (2), 5 μL of the TMV solution was dropped, and left for 10 min. After the given time, a pattern surface was washed by running 100 μL of distilled water in a direction along the pattern, or in a direction orthogonal to the pattern. After the washing, the pattern surface was air-dried.

As a comparison, dropping to a mica substrate that did not have any patterns was performed in a similar manner.

(4) Observation of a Substrate Surface

A substrate surface on which TMV was adsorbed was observed by using an AFM (atomic force microscope). Observation was performed with a scale of 5 or 10 μm. As a result, TMV was confirmed to be adsorbed on an upper surface of a line regardless of the washing directions, such that a molecular length direction was substantially orthogonal to an extending direction of the line of the pattern.

Also confirmed was that an amount of TMV adsorbed on an upper surface of a line changes depending on a density of TMV. FIG. 1 shows each of atomic force microscopic images of substrate surfaces having L/S patterns with pitches of 250 nm. When a density of TMV was 0.1 or 0.5 mg/mL, TMV was adsorbed only on a small portion of an upper surface of a line. Note that all of the adsorbed TMV was adsorbed such that a molecular length direction was substantially orthogonal to an extending direction of the line of the pattern. When a density of TMV was increased, the number of TMV molecules adsorbed on the upper surface of the line was also increased. When a density of TMV was 10 mg/mL, TMV was adsorbed as stacked on some portions of the upper surface of the line, and was adsorbed even on some portions of spaces.

In addition, when dropping a TMV solution having 2 mg/mL of TMV concentration, molecular lengths of TMV adsorbed on an upper surface of a line of each substrate are shown as a histogram. Molecular lengths of TMV adsorbed on a surface of a mica substrate are also shown as a histogram. TMV adsorbed on a surface of a mica substrate reflects a result of TMV contained in a 2 mg/mL TMV solution before dropping. Each of FIGS. 2 to 7 respectively shows a result of a substrate of an L/S pattern having a pitch of 150, 200, 250, 300, 500 nm, or 1 μm. In FIGS. 2 to 7, black bars (right vertical axis) show results of TMV adsorbed on upper surfaces of lines, and white bars (left vertical axis) show results of TMV adsorbed on surfaces of mica substrates. As a result, it was confirmed that TMV having molecular lengths within a certain range were selectively adsorbed on each substrate surface.

Example 2

(1) Preparation of a CNT (Carbon Nanotube) Solution

CNT purified by the CoMoCAT method was used. To 2 mg of the CNT, 1 wt % SDBS solution was added, and stirred by ultrasound to give a CNT solution.

(2) Adsorption of CNT

In a similar manner to Example 1, a substrate having an L/S pattern with a pitch of 200 nm was prepared. Then, the obtained CNT solution was dropped onto a pattern surface of the substrate, and left for 10 min. After the given time, the surface was washed with 100 μL of distilled water, and air-dried.

(3) Observation of a Substrate Surface

AFM observation was performed to a substrate surface on which CNT was adsorbed. Observation was performed with a scale of 5 or 10 μm. Similarly to TMV, it was confirmed that CNT shorter than a line width dimension of a pattern was adsorbed on an upper surface of a line, such that a molecular length direction was substantially orthogonal to an extending direction of the line of the pattern, and CNT longer than the line width dimension had fallen in a space.

Comparative Example 1

In a similar manner to Example 1, a substrate having an US pattern was prepared, and was placed on a bottom surface of a container so that a pattern-formed surface was upside. Then, pure water was poured into the container, and the substrate was immersed therein. Next, 5 μL of 2 mg/mL purified TMV solution, which was prepared in (1) of Example 1, was dropped into the pure water (a concentration of a TMV solution in the container: about 0.01 mg/mL), and left for 1 hr. After that, the solution in the container was removed, and pure water was added instead of the solution. Finally, the substrate was taken out from the container, and air-dried overnight.

AFM observation of the substrate surface confirmed that TMV was not adsorbed not only on an upper surface of the pattern, but also on anywhere in the substrate surface.

Although preferable examples of the present invention are explained above, the present invention is not limited to these examples. Addition, omission, substitution, and other changes can be made without departing from the purpose of the present invention. The present invention is not limited to the above-described example, and is limited only to the scope of the attached claims.

What is claimed is:

1. A method for narrowing a molecular length distribution of rod-shape molecules, the method comprising:
   providing a solution or dispersion comprising rod-shape molecules which exhibit liquid crystalline states, and having a distribution of molecular lengths, $L_R$;
   providing a substrate comprising a pattern of convex structures having flat upper surfaces extending in a line, the structures having a width dimension, $L_w$, defined as the length measured from edge-to-edge of the flat upper surface in a direction perpendicular to the line direction in which the structures extend;
   coating said substrate with said solution or dispersion wherein rod-shape molecules having lengths $0.2L_w \leq L_R \leq 2L_w$ are selectively adsorbed on the upper surface of the convex portion and oriented in a direction perpendicular to the line direction in which the structures extend;
   separating the upper surface of the convex structures from the substrate; and
   collecting the rod-shape molecules adsorbed thereto.

2. The method according to claim 1, further comprising:
   drying the substrate after adsorbing the rod-shape molecules; and
   washing the substrate after drying the substrate.

3. The method according to claim 1, wherein an aspect ratio of the rod-shape molecule, which is molecular length/diameter thereof, is 4 or greater.

4. The method according to claim 1, wherein a density of the rod-shape molecule in the solution or the dispersion liquid is 1 to 10 mg/mL.

5. The method according to claim 1, wherein the pattern is formed on a resist film.

6. The method according to claim 1, wherein the rod-shape molecule is a virus molecule or a carbon nanotube.

* * * * *

UNITED STATES PATENT AND TRADEMARK OFFICE
CERTIFICATE OF CORRECTION

PATENT NO. : 9,149,837 B2
APPLICATION NO. : 13/786989
DATED : October 6, 2015
INVENTOR(S) : Naito et al.

Page 1 of 1

It is certified that error appears in the above-identified patent and that said Letters Patent is hereby corrected as shown below:

Title Page
Page 1 (item 57 – abstract), "an the" should be --on the--.
Page 2 (item 56), under "Other Publications", "Rodlike" should be --Rod-like--.
In the Specification
Col. 1, line 43, "nanostracture," should be --nanostructure,--.
Col. 2, line 29, "used" should be --used,--.
Col. 2, line 37, "thereof," should be --thereof;--.
Col. 3, line 36, "L/8" should be --L/S--.
Col. 3, line 52, "US" should be --L/S--.
Col. 5, line 56, "min" should be --nm--.
Col. 7, line 29, "them" should be --then--.
Col. 8, line 41, "SOBS" should be --SDBS--.
Col. 9, lines 14-15, "of)80°-100°." should be --of 80°-100°).--.
Col. 13, line 10, "US" should be --L/S--.

Signed and Sealed this
Seventh Day of June, 2016

Michelle K. Lee
*Director of the United States Patent and Trademark Office*